United States Patent Office 3,131,125
Patented Apr. 28, 1964

3,131,125
3α,16α-DIHYDROXY-PREGNANE-20-ONE AND ESTERS THEREOF
Albert Wettstein, Riehen, Robert Neher, Binningen, and Pierre Antoine Desaulles, Oberwil, Basel-Land, Switzerland, assignors to Ciba Corporation, a corporation of Delaware
No Drawing. Filed Jan. 26, 1960, Ser. No. 4,604
Claims priority, application Switzerland Sept. 14, 1956
10 Claims. (Cl. 167—65)

This is a continuation in part of our copending application Serial No. 683,979, filed September 16, 1957, and now abandoned.

This invention provides a sodium-eliminating active substance obtained from the urine of patients having adreno-genital salt-loss syndrome.

The invention is based on the observation that a compound capable of eliminating sodium is present in the urine of patients having spontaneously cured congenital adreno-genital salt-loss syndrome, which compound was apparently responsible for the original loss of salt. The compound was isolated by a particular combination of methods in themselves known for extracting steroid hormones from urine. The method consists principally in dissolving in water a crude extract obtained from the urine of patients having the aforesaid syndrome, pre-extracting with a suitable solvent, such as chloroform, enzymatically hydrolysing the aqueous solution, and subjecting to a series of preparative separations by paper chromatography the extract obtained by further extractions with chloroform and the removal of the acid constituents from the extract by washing with sodium carbonate solution, followed by separation of the non-ketonic constituents of the extract by the method of Girard. In each case the biologically active fraction is used for the succeeding chromatography. From the active fractions finally obtained the new substance is obtained in a pure form by crystallization from a suitable solvent. The method is described in detail in one of the examples given below.

It has also been found that the new substance can be produced synthetically by making 3α,16α-dihydroxy-pregnane-20-one of the formula

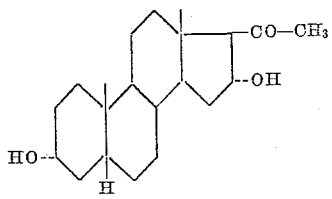

by a method in itself known. In this manner the constitution of the active substance has been established.

The new active substance is synthesized, for example, by starting from Δ16-3α-acetoxy-pregnene-20-one and converting it into the 16,17α-epoxide, and splitting the epoxide group with the formation of a 16α-hydroxyl, for example, by reduction with chromous acetate. The starting material can be obtained by brominating 3α-acetoxy-pregnane-20-one to form the 17α-bromo-derivative followed by the splitting off of hydrogen bromide.

3α,16α-dihydroxy-pregnane-20-one melts at 209–212° C. Its infra-red spectrum in potassium bromide exhibits, inter alia, bands at: 2.98μ, 3.45μ, 3.52μ, 5.86μ, 5.92μ, 6.93μ, 7.22μ, 7.37μ, 7.64μ, 7.92μ, 8.13μ, 8.30μ, 8.43μ, 8.54μ, 8.73μ, 8.98μ, 9.21μ, 9.36μ, 9.60μ, 9.84μ, 10.08μ, 10.60μ, 10.92μ, 11.47μ, 11.75μ and 11.95μ.

The $R_{F_5}$-value (for $F_5$, see Example 1) of the new substance for different solvent systems are as follows:

Formamide/benzene ---------------------- 0.72
Propylene glycol/toluene ---------------- 0.51
Bush $B_3$ ------------------------------ 1.06
Isooctane-butanol-methanol-water
  (50:22.5:22.5:5) ---------------------- 2.08

A few color reactions are given below:
$SbCl_3$ ----------------------------- Blue (U.V.).
Zimmermann (17-ketosteroids) --------- —.
Dinitrophenyl-hydrazine -------------- + (yellow).

The compound can be converted into 3- or 16-mono-esters or into 3,16-diesters. The ester residues are, for example, those of saturated or unsaturated aliphatic or cycloaliphatic, aromatic or heterocyclic carboxylic acids, for example, formic acid, acetic acid, chloracetic acid, trifluoracetic acid, carbamic acids, alkoxy-carboxylic acids, propionic acid, butyric acids, lactic acid, valeric acids, such as n-valeric acid or trimethyl-acetic acid, diethyl-acetic acid, caproic acids such as β-trimethyl-propionic acid, oenanthic acid, caprylic acid, pelargonic acid, capric acid, undecylic acid, for example, undecylenic acid, lauric acid, myristic acid, palmitic acid or stearic acids, for example, oleic acid, or crotonic acid, undecanic acid, cyclopentyl-, cyclohexyl- or phenylacetic acid or -propionic acid, hexahydrobenzoic acid, benzoic acid, phenoxy-alkanoic acids, such as phenoxy-acetic acid, para-chlorophenoxy-acetic acid, 2,4-dichloro phenoxy-acetic acid, 4-tertiary butyl-phenoxy-acetic acid, 3-phenoxy-propionic acid, 4-phenoxy-butyric acid, furane-2-carboxylic acid, 5-tertiary butyl-furane-2-carboxylic acid, 5-bromofurane-2-carboxylic acid, nicotinic acid, isonicotinic acid, and also dicarboxylic acids, such as oxalic acid, succinic acid, maleic acid, glutaric acid, dimethyl-glutaric acid, pimelic acid, acetone dicarboxylic acid, phthalic acid, tetrahydro-phthalic acid, hexahydrophthalic acid, endomethylene-tetrahydrophthalic acid, endomethylene-hexahydrophthalic acid, endoxy-hexahydrophthalic acid, endoxy-tetrahydrophthalic acid, camphoric acid, cyclopropane dicarboxylic acid, cyclobutane dicarboxylic acid, diglycollic acid, ethylene-bis-glycollic acid, polyethylene-bis-glycollic acids, quinolinic acid, cinchromeronic acid, and also polyethylene glycol monoalkyl ether semi-esters of the aforesaid dicarboxylic acids or keto-carboxylic acids such as β-keto-carboxylic acids, for example, acetoacetic acid, propionyl acetic acid, butyryl acetic acid, or capronyl-acetic acid, or amino-acids such as diethylamino-acetic acid etc. Instead of carboxylic acid residues there may be present those of sulfonic acids, such as of methane sulfonic acid or toluene sulfonic acid or of inorganic acids such as phosphoric or sulfuric acids.

These esters can be made by methods in themselves known. Thus, the active substance may be reacted with an acid such as one of those mentioned above, or a functional derivative thereof, such as its halide, anhydride, thiol derivative or ketone. Furthermore, transesterification methods may be used. By suitably selecting the reaction conditions and the proportions of the reagent used, the active substance can be completely or partially esterified. When diesters are obtained they may be partially hydrolysed. This is carried out, for example, by chemical or enzymatic hydrolysis, for example, with the use of an acid or basic agent, or by transesterification. From the monoesters so obtained there can be produced by subsequent esterification diesters of which the acyl residues may be different from one another.

The active substance obtained by the above process is biologically characterized by its acute increase in the elimination of sodium in animals without specifically influencing the potassium in the quantity of urine eliminated during the period of the experiment. The determination of the elimination of electrolytes (sodium and potassium) and the elimination of water is carried out, for example, under the experimental conditions laid down in the publication of P. Desaulles and R. Meier (Schweiz. Med. Wschr. 86, supplement to vol. 37, page 1060 (1956).

The factor promoting the elimination of sodium can be used therapeutically for re-establishing a disturbed sodium equilibrium, especially in cases of sodium retention, for example, in oedemae and circulatory disturbances including high blood pressure.

The active substance of the invention and its esters can be used, for example, in the form of mixtures which contain the active substance or an ester thereof, and a solid or liquid carrier for medicaments. The mixtures are made up by methods in themselves known, for example, with the use of a pharmaceutical organic or inorganic carrier suitable for parenteral, enteral or topical administration. As carriers there are used substances which do not react with the new compounds, for example, water, vegetable oils, benzyl alcohols, polyethylene glycols, gelatine, lactose, starches, magnesium stearate, talc, white petroleum jelly, cholesterol or other carrier known for medicaments. There are prepared more especially preparations for parenteral administration, preferably solutions and primarily oily or aqueous solutions, and also suspensions, emulsions or tablets for implantation. For enteral administration tablets or dragees may also be prepared, and for topical administration salves or creams. If desired, the preparations may be sterilized or may contain auxiliary substances, such as preserving, stabilising, wetting or emulsifying agents, salts for regulating the osmotic pressure or buffers. They may also contain other therapeutically useful substances. The preparations are obtained in the customary way. The content of active substance in these preparations, such as in an ampoule is preferably 0.1–200 mg., or 0.01–30%.

The following examples illustrate the invention:

*Example 1*

11 liters of urine from a patient having a spontaneously cured congenital adreno-genital salt-loss syndrome were mixed with 5.5 kilograms of ammonium sulfate, and the mixture was extracted three times on each occasion with 11 liters of a mixture of ether and ethanol in the ratio 3:1. After evaporating the solvent, there remained behind 55.49 grams of crude extract, which was then dissolved in 1 liter of water and pre-extracted with chloroform. The aqueous solution was adjusted to a pH value of 4.6, 50 ml. of an m-acetate buffer (n-acetic acid–n–sodium acetate, 1:1) were added and incubation with 500,000 units of $\beta$-glucuronidase from the gastric juice of *Helix pomatia* was carried out for 6 hours at 38° C. At the end of this period the same quantity of the enzyme was added and allowed to act for a further 12–14 hours, whereupon the mixture was extracted in the usual manner with chloroform. By washing the extract solution neutral with hydrochloric acid, water and sodium carbonate solution and evaporating the solvent, there were obtained 1.847 grams of an enzymatically hydrolysed neutral extract. The latter was allowed to stand in 100 cc. of ethanol and 10 cc. of glacial acetic acid with 2 grams of Girard reagent T for 24 hours at 20° C., the whole was then poured into water, and freed from non-ketonic constituents by extraction with chloroform. From the aqueous solution there were obtained by the addition of 10% by volume of concentrated hydrochloric acid and extraction with chloroform the important ketonic constituents, which were washed neutral with water, freed from the solvent, and subjected to a multiple paper chromatography. The material was first subjected to descending chromatography on 60 sheets of Whatman paper No. 1 with the system formamide/benzene-chloroform (1:1) with the use of a guide dyestuff $F_5$ (=4-nitro-2′methyl-4′-diethanol-amino-azobenzene), the dyestuff $F_5$ having an $R_F$-value of about 0.6. A zone 6 cm. wide, in the centre of which were the dyestuff and the active substance, was cut out transversely of the direction of travel and eluted with aqueous methanol. The eluate was evaporated and then chromatographed on 30 sheets of Whatman paper No. 1 in the system propylene glycol/toluene in a descending manner by the elution method until $F_5$ was present in the lower third of the sheets. With reference to dyestuff $F_5$ (=1) the active substance was then present in a more slowly migrating zone between $R_{F_5}=0.35$ to 0.60. This zone was again eluted and subjected to descending chromatography with elution on 10 sheets of Whatman paper No. 1 with the system formamide/benzene until the guide dyestuff $F_5$ was present in the lower third of the sheets. The active substance was present in this chromatogram in a zone bounded by the lines $R_{F_5}$ 0.50 and 0.78. It was again eluated with aqueous methanol. In order finally to isolate the active substance the eluate last obtained was subjected to descending chromatography with elution on five sheets of Whatman paper No. 1 in the system Bush $B_3$ until the guide dyestuff $F_5$ had reached the middle of the sheet. The active substance was then eluted from the zone immediately below $F_5$ ($R_{F_5}=1.00-1.35$). The residue was treated with a mixture of acetone and pentane, whereby the sodium-eliminating active substance crystallized out in needles melting at 209–212° C. The yield was about 2 milligrams per 10 liters of urine.

*Example 2*

230 milligrams of $\Delta^{16}$-3$\alpha$-acetoxy-pregnene-20-one, obtained by splitting off hydrogen bromide from 17$\alpha$-bromo-3$\alpha$-acetoxy-pregnane-20-one by means of lithium chloride in pyridine, were dissolved in 20 cc. of methanol. To the solution were added 2 cc. of hydrogen peroxide of 30% strength and 2 cc. of an aqueous solution of 5% strength of sodium hydroxide, and the whole was allowed to stand for 16 hours at 20° C. The mixture was then diluted with water and extracted with ether. The ethereal solution was washed with water, dried and evaporated. The residue was recrystallized from a mixture of ether and pentane, and gave needles of 3$\alpha$-hydroxy-16,17$\alpha$-epoxy-pregnane-20-one melting at 200–203° C.

80 milligrams of the resulting epoxide were dissolved in 10 cc. of glacial acetic acid, a suspension of 15 equivalents of chromous acetate in 5 cc. of water was added, and after evacuating the vessel, the whole was agitated for 15 hours at 20° C. The contents of the flask were poured into 50 cc. of water, and the water was exhaustively extracted with a mixture of ether and chloroform in the ratio 3:1. By drying the extract solution and distilling off the solvent, a residue was obtained (70 milligrams) which, when recrystallized from a mixture of ether and pentane, gave 10 milligrams of pure 3$\alpha$,16$\alpha$-dihydroxy-pregnane-20-one melting at 211–213° C.

The synthetically prepared product caused no melting point depression in admixture with the product obtained from urine as described in Example 1. Their infra-red spectra were identical. The synthetic product also gave the same color reactions and had the same migration speeds as the product isolated from urine. Finally, both compounds were found to have the same physiological activity.

The 3$\alpha$,16$\alpha$-diacetate can be obtained by treating the active substance, for example, with acetic anhydride and pyridine by methods in themselves known.

What is claimed is:
1. 3α,16α-dihydroxy-pregnane-20-one.
2. A 3α-monoester of the compound claimed in claim 1, said monoester being derived from a lower aliphatic carboxylic acid.
3. A 16α-monoester of the compound claimed in claim 1, said monoester being derived from a lower aliphatic carboxylic acid.
4. A 3α,16α-diester of the compound claimed in claim 1, said diester being derived from lower aliphatic carboxylic acids.
5. 3α,16α-dihydroxy-pregnane-20-one-3,16-diacetate.
6. A pharmaceutical composition comprising essentially a member selected from the group consisting of 3α,16α-dihydroxy-pregnane-20-one, a 3α-monoester thereof, a 16α-monoester thereof, and a 3α,16α-diester thereof, said esters being derived from lower aliphatic carboxylic acids in an amount ranging from 0.1–30% together with a suitable pharmaceutical carrier.
7. A pharmaceutical composition as claimed in claim 6, containing the active ingredient in an amount ranging from 0.01–30% together with a suitable pharmaceutical carrier in the form of a tablet.
8. A pharmaceutical composition as claimed in claim 6, containing the active ingredient in an amount ranging from 0.01–30% together with a suitable pharmaceutical carrier in the form of an oil ampoule.
9. A pharmaceutical composition as claimed in claim 6, containing the active ingredient in an amount ranging from 0.01–30% together with a suitable pharmaceutical carrier in the form of an ampoule containing an aqueous solution.
10. A pharmaceutical composition containing 3α,16α-dihydroxy-pregnane-20-one-3,16-diacetate in an amount ranging from 0.01 to 30% together with a suitable pharmaceutical carrier.

References Cited in the file of this patent
UNITED STATES PATENTS
2,901,492    Herz ------------------ Aug. 25, 1959

OTHER REFERENCES
Hirschmann: JACS, vol. 78, 1956, pp. 3755–3758.
Neher et al.: Helv. Chim. Acta, 42: 1, February 2, 1959, pp. 132–152.

UNITED STATES PATENT OFFICE
CERTIFICATE OF CORRECTION

April 28, 1964

Patent No. 3,131,125

Albert Wettstein et al.

It is hereby certified that error appears in the above numbered patent requiring correction and that the said Letters Patent should read as corrected below.

Column 5, line 20, for "0.1-30%" read -- 0.01-30% --.

Signed and sealed this 8th day of September 1964.

(SEAL)
Attest:

ERNEST W. SWIDER
Attesting Officer

EDWARD J. BRENNER
Commissioner of Patents